United States Patent
Hofmann

(10) Patent No.: US 7,160,490 B2
(45) Date of Patent: Jan. 9, 2007

(54) PROCESS FOR CONTROL OF PRODUCTION MACHINE

(75) Inventor: Werner Hofmann, Schnaittach (DE)

(73) Assignee: Siemens Aktiengesellschaft, Munich (DE)

( * ) Notice: Subject to any disclaimer, the term of this patent is extended or adjusted under 35 U.S.C. 154(b) by 326 days.

(21) Appl. No.: 09/892,412

(22) Filed: Jun. 27, 2001

(65) Prior Publication Data
US 2002/0140119 A1    Oct. 3, 2002

(30) Foreign Application Priority Data
Mar. 28, 2001    (DE) .............................. 101 15 253

(51) Int. Cl.
B29C 45/76    (2006.01)
G05B 11/00    (2006.01)

(52) U.S. Cl. .................. 264/40.1; 264/328.1; 700/54; 700/70; 700/200

(58) Field of Classification Search .............. 264/40.1, 264/40.5, 40.7, 328.1; 425/145, 149; 700/53, 700/54, 67, 70, 200
See application file for complete search history.

(56) References Cited

U.S. PATENT DOCUMENTS 5,062,785 A * 11/1991 Stroud et al. ............... 425/145
5,371,450 A * 12/1994 Hiraoka ....................... 425/145
5,425,906 A *  6/1995 Hashimoto ................. 264/40.1
5,585,053 A * 12/1996 Arai ........................... 264/40.1
5,595,693 A    1/1997 Fujita et al.
5,733,486 A    3/1998 Hayasi et al.
5,916,501 A *  6/1999 Hehl ........................... 264/40.1
6,325,954 B1* 12/2001 Sasaki et al. ............... 264/40.1
6,562,261 B1*  5/2003 Onishi ........................ 264/40.1

FOREIGN PATENT DOCUMENTS

| DE | 4446857 | 12/1994 |
|----|---------|---------|
| DE | 19625880 | 6/1996 |
| EP | 0126174 | 5/1983 |
| EP | 0246326 B1 | 10/1986 |
| EP | 1022110 | 7/2000 |
| JP | 60107315 | 6/1985 |
| JP | 03010823 | 1/1991 |

\* cited by examiner

Primary Examiner—Jill L. Heitbrink
(74) Attorney, Agent, or Firm—Baker Botts L.L.P.

(57) ABSTRACT

The invention relates to a production machine with a hydraulic and/or electric drive and also measured data acquisition for at least one positional determination and at least two measured variables dependent on the latter in the production machine. If a further setpoint profile is exceeded, a setpoint input is corrected directly in the form of a substitutional open-loop or closed-loop control.

2 Claims, 3 Drawing Sheets

PROCESS FOR CONTROL OF PRODUCTION MACHINE

BACKGROUND OF THE INVENTION

The invention relates to a production machine with a hydraulic and/or electric drive, and also measured data acquisition for at least one positional determination and at least two measured variables dependent on the latter in the production machine.

The development of simple, effective and reliable production machines and methods for their open-loop and closed-loop control provides an impetus motivation to improve technical processes. The present invention is such an improved technical process.

EP 0 246 326 B1 discloses a method of controlling an injection mechanism of an injection-molding machine. Measuring force at the load or measuring the injection pressure is used purely and simply for current control of a drive source.

The object of the present invention is to design a production machine of the type referred to above in such a way that, if additional positionally dependent process variables are exceeded, a positionally dependent setpoint input can be influenced by an amount dependent on the degree to which they are exceeded in a counteracting way by simple and effective action.

SUMMARY OF THE INVENTION

According to the present invention, this object is achieved by providing a first positionally dependent setpoint determination, which can be influenced in a counteracting way in at least one parallel open-loop or closed-loop control branch, with a setpoint correction being provided on the basis of a further positionally dependent setpoint profile of at least one further positionally dependent measured variable being exceeded. Consequently, a further open-loop or closed-loop control path in the form of a substitutional open-loop or closed-loop control is only utilized if the process profile monitored there is exceeded.

A preferred design of the invention, in which the production machine is a plastic injection-molding machine, is characterized in that the injection pressure and the position of an advancing screw driving the injection action can be registered as measured variables and at least one speed/displacement profile of the advancing screw can be predetermined as a positionally dependent setpoint value, which can be influenced in a counteracting way if a pressure/displacement profile of the injection pressure is exceeded. This advancement has the effect that essential process parameters of a plastic injection-molding machine can be registered in a simple and effective way and can be influenced for the purpose of optimum process control to achieve high-quality plastic injection-molded products.

A further preferred design of the present invention wherein at least two positionally dependent measured variables of a plastic injection mold can be registered, is characterized in that at least one speed/displacement profile of the mold can be predetermined as a positionally dependent setpoint value, which can be influenced in a counteracting way if a closing pressure/displacement profile of the mold is exceeded. Process control and monitoring of the mold in the injection molding cycle enable the early detection and avoidance of any fault damage or even destruction of the injection-molded past during operation.

Yet a further preferred design of the present invention is characterized in that at least two positionally dependent measured variables of an ejection mechanism of a plastic injection mold can be registered and in that at least one speed/displacement profile of the ejection mechanism can be predetermined as a positionally dependent setpoint value, which can be influenced in a counteracting way if an ejecting force/displacement profile of the ejection mechanism is exceeded. Process control and monitoring of the ejection mechanism has the effect that damage to or even destruction of the ejection mechanism or the plastic injection-molded part is detected at an early time and avoided.

Still another preferred design of the present invention is characterized in that, as an alternative or in addition to a speed/ or measured-variable/displacement profile, a speed/ or measured-variable/time profile can be predetermined. Depending on suitability, consequently a displacement or time profile can be used for optimum process monitoring or control.

Another preferred design of the present invention is characterized in that, as an alternative or in addition to a speed/ or measured-variable/displacement or time profile, a physically or technologically linked displacement or time profile can be predetermined. Consequently, depending on suitability, physically or technologically linked process variables can be used for programming or visual representation.

It is further contemplated that the present invention is utilized in an industrial press. In the case of an industrial press, there are process parameters that are technologically similar to those present in a plastic injection-molding machine. These process parameters can be advantageously monitored and controlled in accordance with the present invention.

A preferred method for the open-loop control of a production machine having a hydraulic or electric drive, measured data acquisition for at least one positional determination, and at least two measured variables dependent on the latter, is characterized by the following:

at least one actual position of a movement system is registered, a setpoint input takes place by means of at least one speed/displacement profile or a displacement profile derived from the speed, and in a further control branch with at least one further positionally dependent measured-variable/displacement profile, the setpoint input is influenced in a counteracting way if this second profile is exceeded.

Based on this method, measured variables and setpoint inputs of a production machine are monitored with a simple and effective action.

A further preferred method for the open-loop control of a plastic injection-molding machine having a hydraulic or electric drive, measured data acquisition for (i) a positional determination of an advancing screw, (ii) an advancing screw speed (or rate of injection) and (iii) an injection pressure, is characterized by the following:

at least one actual position of a movement system is registered;

a setpoint input takes place by means of at least one speed/displacement profile or a displacement profile derived from the speed; and in a further control branch with a further positionally dependent measured-variable/displacement profile, the setpoint input is influenced in a counteracting way if this second profile is exceeded.

Based on this method, a wide variety of parameters and setpoint inputs of a plastic injection-molding machine can be monitored and predetermined in a simple and effective way.

Yet another preferred method for the open-loop control of a mold of a plastic injection-molding machine having a hydraulic or electric drive, case measured data acquisition for (i) a positional determination of the mold, (ii) a closing and/or opening speed and (iii) an opening and/or closing pressure, is characterized by the following:

at least one actual position of a movement system is registered;

a setpoint input takes place by means of at least one speed/displacement profile or a displacement profile derived from the speed; and in a further control branch with at least one further positionally dependent measured-variable/displacement profile, the setpoint input is influenced in a counteracting way if this second profile is exceeded. Based on this method, the optimum functional capability of a mold of a plastic injection-molding machine can be controlled and monitored.

Another preferred method for the open-loop control of an ejection mechanism of a mold of a plastic injection-molding machine having a hydraulic or electric drive, measured data acquisition for (i) a positional determination (ii) a speed and (iii) an ejecting force of the ejection mechanism, is characterized by the following:

at least one actual position of a movement system is registered;

a setpoint input takes place by means of at least one speed/displacement profile or a displacement profile derived from the speed; and in a further control branch with at least one further positionally dependent measured-variable/displacement profile, the setpoint input is influenced in a counteracting way if this second profile is exceeded.

Based on this method, an ejection mechanism can be controlled and monitored in a particular way with respect to its optimum operation and a plastic injection-molded part can be controlled and monitored to enable the mold part to be ejected from the mold without being damaged.

Yet another preferred method is characterized in that, as an alternative to or in addition to a speed/ or measured-variable/displacement profile, a speed/ or measured-variable/time profile is used. Consequently, a favorable profile for simple and clear programming or visual representation can be selected.

A further preferred method of the present invention is characterized in that, as an alternative to or in addition to a speed/ or measured-variable/displacement or time profile, a physically or technologically linked displacement or time profile is predetermined. Consequently, optimally physically or technologically descriptive process variables can be used for the setpoint input, monitoring or else visual representation of measured variables.

The aforesaid method, for the open-loop control of a production machine are equally suited to an industrial press. Accordingly, disclosed in the context of a plastic injection-molding machine due to technological relationships, the method used in the case of a plastic injection-molding machine can also be advantageously transferred to an industrial press.

DRAWINGS

An exemplary embodiment of the present invention is explained in more detail below and represented in the following drawings, in which.

DETAILED DESCRIPTION OF THE INVENTION

Figure 1:
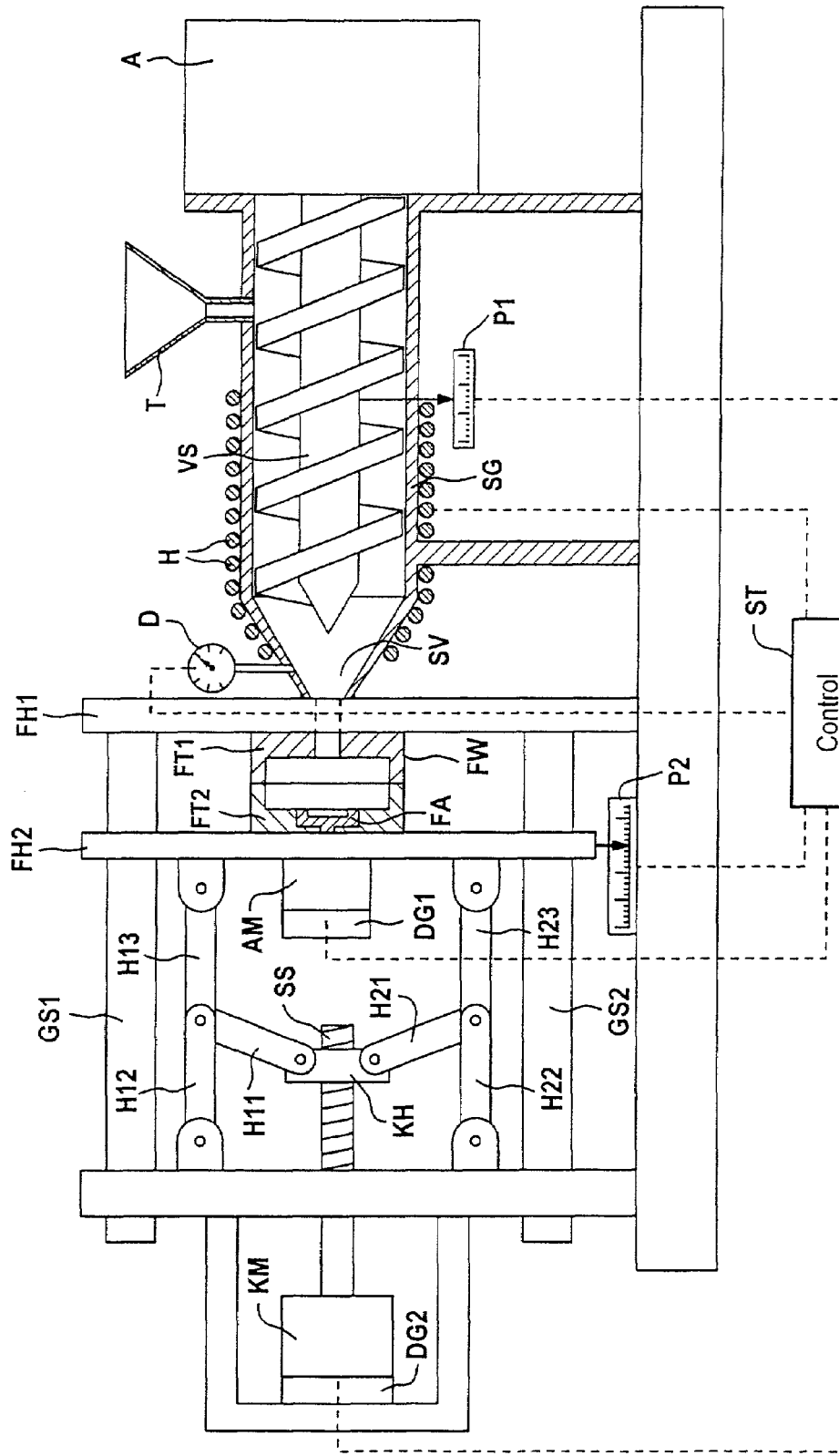
FIG. 1 shows a symbolic side view of a plastic injection-molding machine, in which the screw housing and also the mold are shown in a sectional form.

FIG. 1, shows a side view of a plastic injection-molding machine. Polymer granules, not shown for the sake of overall clarity, pass via hopper T into a screw housing SG and are transported into the mold FW by an advancing screw VS, which is moved by a drive A. Along the screw housing SG there are heating coils H, which heat up the polymer granules allowing their path and make them take the form of a flowable (plastic) polymer material in the space SV in front of the screw.

To achieve a high rate of production of plastic injection-molded parts, it must be endeavored to use a high rate of injection into the mold FW. With the aid of a pressure sensor D, the injection pressure exerted on the plastic material in the space SV in front of the screw is monitored by an open-loop control system ST or, alternatively a closed-loop control system. The pressure monitoring with a pressure sensor D may take place at other suitable positions of the machine, such as for example in the journal bearing of the machine.

If a specific pressure value is exceeded, there is an irreversible and undesired change in the material properties of the plastic material. The injection pressure built up in the space SV in front of the screw is decisively determined by the forward movement of the advancing screw VS induced by the drive A. The drive A may comprise a plurality of motors, which separately induce a rotational and/or forward movement of the advancing screw VS with the aid of a transmission mechanism.

A positional determination P1 transmits information on the actual position of the advancing screw VS to an open loop control system ST, denoted in FIG. 1 by the term "control". All measured variables registered by the control system ST are indicated by broken connecting lines. The positional determination PI may be realized for example by a rotary transducer or else by a linear displacement sensor.

In a plastic injection-molding machine, monitoring and control of the heating temperature is also of interest, since an overheating of the plastic material also leads to undesired changes in material properties. Monitoring of the heating temperature may also be part of a monitoring process according to the present invention. For example, a temperature/time profile dependent on the production cycle is fed in as the setpoint input of the heating. Therefore, a broken connecting line is shown in FIG. 1 between the heating coils H and the control system ST.

During the injection operation, the plastic material is usually injected into the mold SW at a specific rate. A sustained rate of injection leads to a very steep increase in pressure in the space SV in front of the screw. The invention allows a rapid response to this increase in pressure, in that action is taken to influence the manipulated variable directly in the form of a substitutional closed-loop or open-loop control.

Once the mold FW is filled with plastic material, the solidifying operation begins. Any accompanying shrinkage process can be compensated by forcing further plastic material into the mold.

Once the injecting and solidifying operation has been completed, the mold FW comprising the mold parts FT1 and FT2 is moved apart. The mold part FT1 is fastened to the mold holder FH1 and is not moved. The mold part FT2 is fastened to the mold holder FH2 and can be moved horizontally away from the mold part FTI. With the aid of a toggle lever mechanism, the mold holder FH2 slides on the sliding rails GS1 and GS2 horizontally away from the mold part FT1. In FIG. 1, the toggle lever mechanism comprises a toggle lever nut KH and three lever pieces (H11 to H13, and also H21 to H23), arranged symmetrically in relation to said nut. In further embodiments, the toggle lever mechanism may comprise a multiplicity of lever pieces, and alternatively be hydraulically and/or hydromechanically driven.

A toggle lever motor KM is used to drive a spindle screw SS, which moves the toggle lever nut KH horizontally and thereby takes the lever pieces H11 to H23 along with it in such a way that the mold holder FH2 is moved horizontally.

A positional determination P2, which may for example take the form of a linear displacement sensor, transmits the actual position of the mold holder FH2 to the control system ST.

To determine the position of the toggle lever nut KH, a toggle lever motor KM is fastened to a rotary transducer DG2, which passes on its information to the control system ST.

To be able to remove the plastic injection-molded parts from the mold FW after solidifying, there is a molding ejector FA in the mold part FT2. This is driven by an ejection mechanism motor AM and presses the plastic product to be ejected out of the mold part FT2. Similarly fastened to the ejection mechanism motor AM is a rotary transducer DG1, which determines the position of the molding ejector FA. A further ejection mechanism may be located on the mold part FT1.

A combination of a motor (KM, AM, A) with a rotary transducer (DG1, DG2) or with a positional determination (P1, P2) allows various measured variables to be registered. It is possible to register the position, the distance covered during a time, and also the torque of the respective motor KM, AM, A. It is consequently possible, for example, to determine the position of the molding ejector FA, and also the force exerted on the plastic product, obtained by a conversion of the measured torque.

Figure 2:
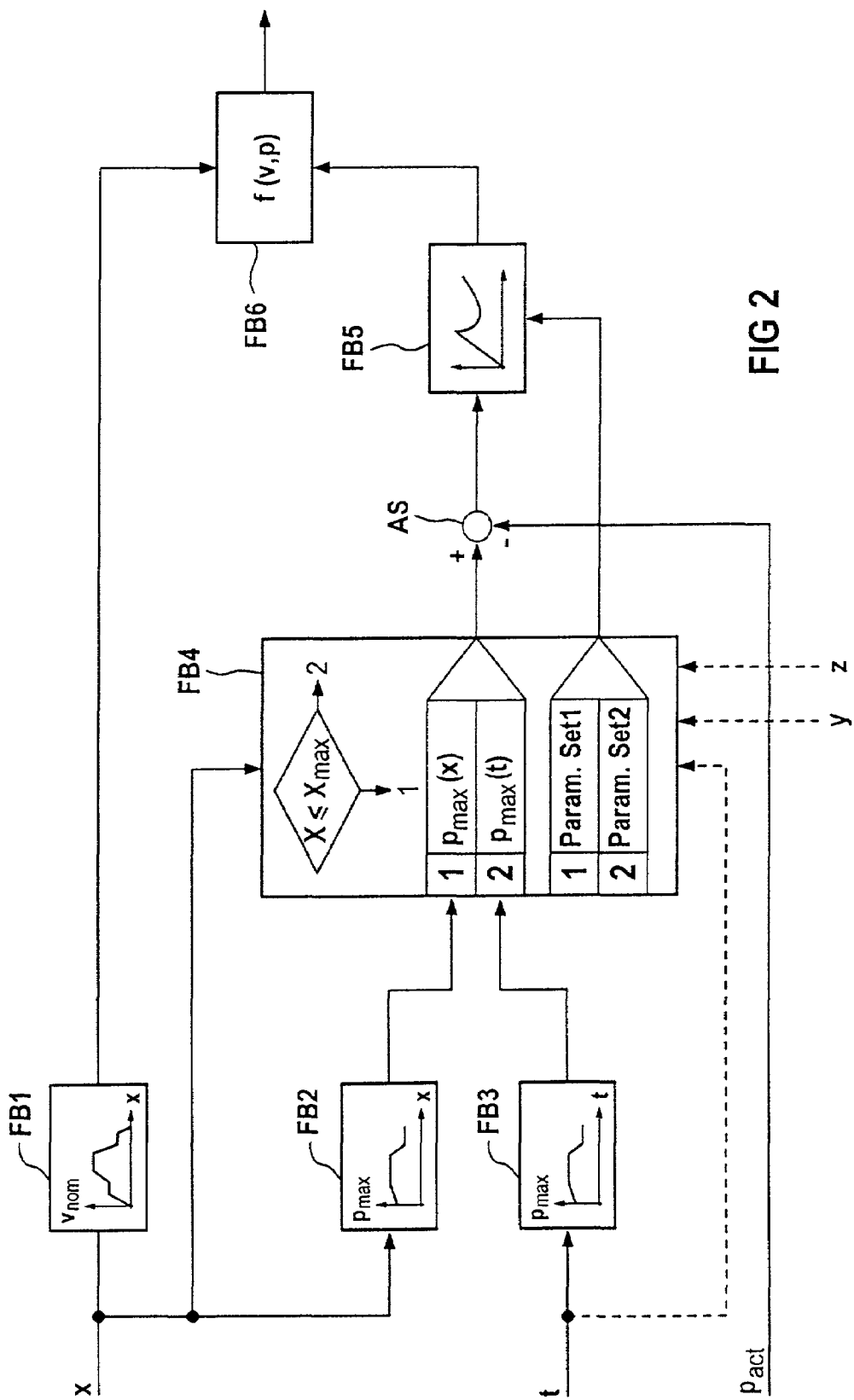
FIG. 2 shows a basic functional block diagram of the production machine control with at least two mutually dependent measured variables.

FIG. 2 shows a functional block diagram of the open-loop production-machine control. A machine coordinate, denoted in FIG. 2 by "x", is fed to a function block FB1, which determines a positionally dependent setpoint value. This setpoint value is converted in a function block FB6 into a machine control parameter ("$n_{nom}$").

In a further function block FB2, a likewise positionally dependent setpoint-value profile is output. This setpoint-value profile is passed through a function block FB4 if, in the case of a displacement-dependent profile, a specific displacement mark "$x_{max}$" has not been exceeded. In the function block FB4, to which the machine coordinates "x" are also fed, this is identified by a rhombic decision block. If a defined machine position "$x_{max}$" is exceeded, the variables or parameters denoted by "2" are passed on to the addition point AS. At this point, a measured parameter is subtracted from a function value of the function block FB4. The subtraction at the addition point AS is identified by a minus sign "−".

The process path associated with the function block FB3 is associated with a plastic injection-molding machine and does not have to apply in this form to other production machines. A time-dependent setpoint-value profile is stored in it.

At the addition point AS, differential signals, which are formed by a setpoint-value profile and current measured values "$p_{act}$", are passed on to the function block FB5. This uses its programmed properties to model the closed-loop or open-loop control system. It receives its closed-loop or open-loop control parameters for the system as a set of parameters from the function block FB4. The function block FB5 outputs a setpoint correction signal to the function block FB6.

All the data connections in the representation according to FIG. 2 take the form of arrow connections and symbolize a directed data flow. A time unit signal "t" is available in the function block diagram shown and is passed to the function block FB3. A broken-line connection between the time unit signal "t" and the function block FB4 is intended to indicate that the machine-position-dependent decision in the function block FB4 may also be substituted by a time-dependent decision. This means that, once a specific time "t" has elapsed, the data denoted by "2" are processed instead of the data denoted by "1". Similarly, further variables or process parameters may lead to a single-stage or multi-stage changeover of input and/or output data. With a specific weighting or function, these can bring about the changeover point. This is shown in FIG. 2 by arrows represented by dashed lines at the function block FB4 with the designation "y", "z".

The function block diagram just presented is to be applied below to a plastic injection-molding machine. The positional determination P1 of the advancing screw VS supplies the input signal "x" for the function block FBI. Dependent on the advancing screw VS, this block passes on a speed setpoint value to the function block FB6. This block converts the speed setpoint value into a nominal speed "$n_{nom}$" for the drive A.

In the function block FB2, a positionally dependent pressure setpoint profile is stored and is passed on to the addition point AS as long as a specific position "$x_{max}$" is not exceeded. The current injection pressure in the space SV in front of the screw is determined by the pressure sensor D and made available to the control system as "$p_{act}$". At the addition point AS, the current pressure is subtracted from the pressure setpoint profile and the differential signal is passed on to the function block FB5. Only if the positionally dependent pressure setpoint profile from the function block FB2 is exceeded by the current pressure value does the substitutional open-loop control intervene in a correcting manner. In the function block FB6, a correction signal is processed and a new setpoint value is provided. The nominal speed of the drive A is in this case reduced.

From a specific displacement mark of the advancing screw VS, the mold FW is filled with plastic material and the rate of injection has to be reduced to avoid an inadmissible increase in pressure in the space SV in front of the screw. If the current position of the advancing screw VS is the same as the position "$x_{max}$", the function block FB4 changes over to a data path "2". A time-dependent pressure setpoint profile of the function block FB3 is then transmitted to the addition point AS. Since the mold FW is filled, the system parameters for the open-loop control ST also change. Now, a set of parameters denoted by "2", which is identified in FIG. 2 by "Param.Set2", is similarly transmitted to the function block FB5. As a result, a separate setpoint profile is provided for an injection phase and a holding-pressure phase. Further variables or process parameters may be used for determining a changeover point of a plastic injection-molding machine with a specific weighting or function. These variables may be, for example, an actual position of the advancing screw, an injection pressure or a production cycle time.

Figure 3:
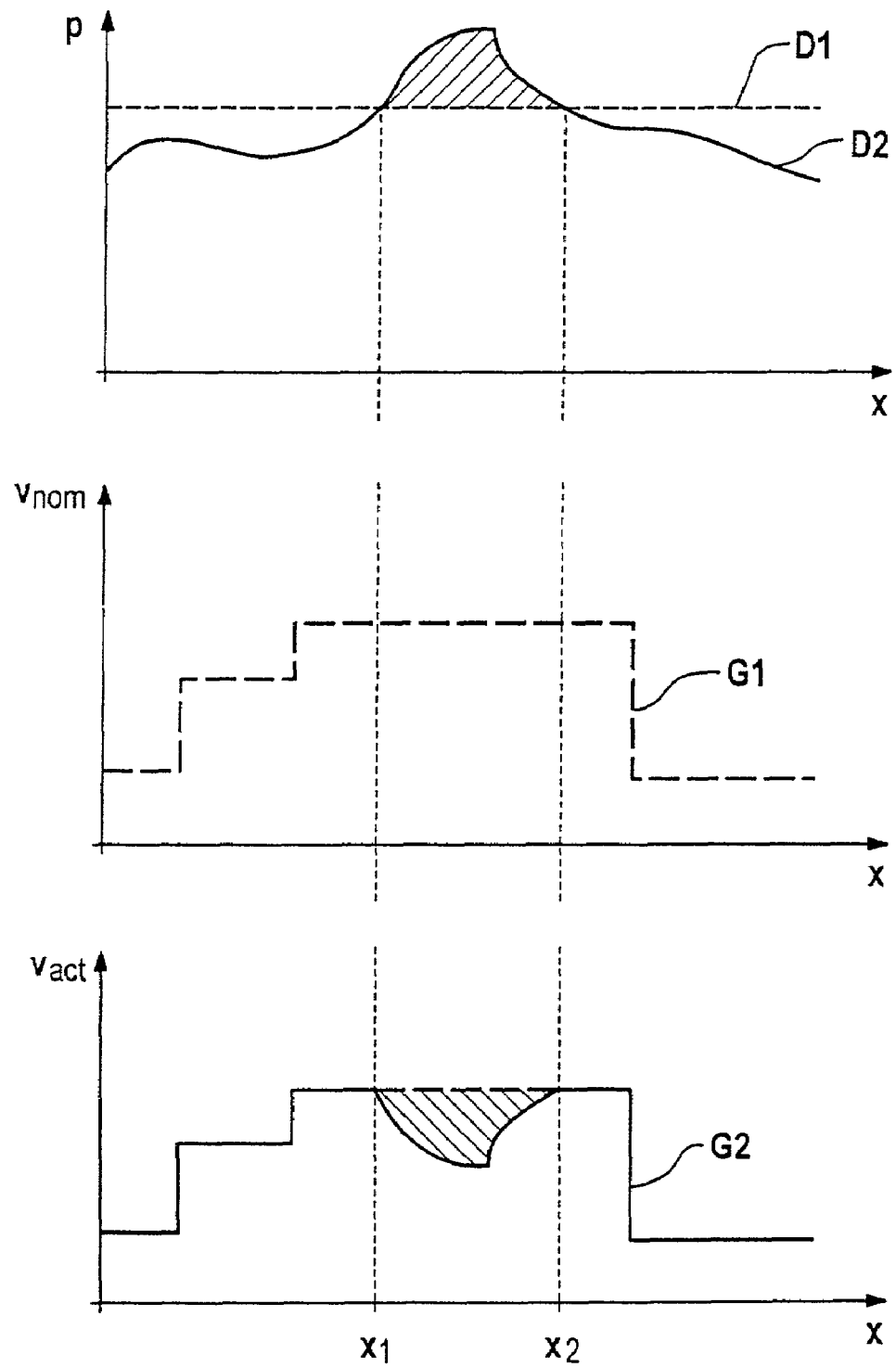
FIG. 3 shows by way of example actual and setpoint-value graphs of a plastic injection-molding machine.

In to FIG. 3, actual- and setpoint-value graphs of the aforementioned situation are shown. In this Figure, a horizontal broken line D1 denotes a setpoint pressure curve and a solid line denotes a measured pressure curve D2 in a p(x) diagram. The vertical broken lines, which run over further diagrams, confine an x range between $x_1$ and $x_2$. In this range, the pressure curve D2 runs above the pressure curve D1. The area defined by this is shown by broken lines in the p(x) diagram.

A $v_{nom}(x)$ diagram shows a speed setpoint curve G1, which is shown by a broken line.

A $v_{act}(x)$ diagram shows a measured speed curve G2. This defines a hatched area with a horizontal line shown as a broken line.

In the x range identified by the vertical broken lines, the injection pressure exceeds the predetermined maximum pressure curve D1. The speed setpoint profile G1 is constant in this range. On account of the injection pressure being exceeded, the speed setpoint profile G1 is corrected in the substitutional control branch described with reference to FIG. 2 and formed by the function blocks FB2, FB4, FB5 and the addition point AS. Consequently, the measured variable which exceeds a predetermined profile acts directly on a setpoint value.

Moreover, it should also be mentioned that the setpoint correction described above may also take place when setpoint values are not reached. Similarly, it is conceivable for bands of setpoint values to be predetermined, so that corrective action is taken if measured values leave this band.

Furthermore, it should be mentioned that the methods described can also be suitably used in particular for production machines which have displacement and pressure among their process parameters. An industrial press may be mentioned here by way of example. A press is technologically no different than the injection mechanism of a plastic injection-molding machine, although of course the dimensioning with respect to the forces to be controlled has to be adapted to the respective application.

The invention claimed is:

1. A method for the open-loop control of a production machine comprising the steps of:
   determining a first setpoint from at least a first variable by a speed/displacement profile;
   determining a first intermediate setpoint from said first variable by a pressure/displacement profile,
   determining a second intermediate setpoint from a second variable by a pressure/time profile;
   selecting either said first intermediate setpoint or said second intermediate setpoint as a third intermediate setpoint depending on said first variable;
   correcting said third intermediate setpoint with a third variable to generate a second setpoint; and
   generating a machine control parameter from said first setpoint and said second setpoint.

2. A method according to claim 1, wherein the step of generating said second setpoint comprising the step of selecting a first set of parameters or a second set of parameters depending on said first variable and modeling said corrected third intermediate setpoint.

* * * * *